(12) United States Patent
Mita et al.

(10) Patent No.: US 11,667,224 B2
(45) Date of Patent: Jun. 6, 2023

(54) PORTABLE TERMINAL HOLDING DEVICE FOR VEHICLE

(71) Applicant: TOYOTA JIDOSHA KABUSHIKI KAISHA, Aichi-ken (JP)

(72) Inventors: Hiroyuki Mita, Nagoya (JP); Hiroshi Mizobata, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 64 days.

(21) Appl. No.: 17/342,543

(22) Filed: Jun. 9, 2021

(65) Prior Publication Data

US 2021/0387556 A1 Dec. 16, 2021

(30) Foreign Application Priority Data

Jun. 10, 2020 (JP) .............................. JP2020-100803

(51) Int. Cl.
*B60N 3/00* (2006.01)

(52) U.S. Cl.
CPC .................................... *B60N 3/002* (2013.01)

(58) Field of Classification Search
CPC ..... B60R 7/043; B60R 11/02; B60R 11/0241; B60R 11/0252; B60R 2011/027; B60R 2011/0294; B60R 2011/0082; B60N 3/002; B60N 2/79; B60N 2/793
USPC ..................................................... 296/37.15
See application file for complete search history.

(56) References Cited

U.S. PATENT DOCUMENTS

| | | | | |
|---|---|---|---|---|
| 7,506,923 B1* | 3/2009 | Gauss | ................ | B64D 11/0638 |
| | | | | 297/154 |
| 2005/0258672 A1* | 11/2005 | Schweizer | ......... | B64D 11/0638 |
| | | | | 297/145 |
| 2018/0208089 A1* | 7/2018 | Harris | .................... | B60N 2/793 |
| 2018/0281968 A1* | 10/2018 | Daniel | .............. | B64D 11/0636 |
| 2018/0354398 A1* | 12/2018 | Lamb | ................... | F16M 11/041 |
| 2019/0184877 A1* | 6/2019 | Gomez | ..................... | B60N 2/20 |
| 2020/0354063 A1* | 11/2020 | Satterfield | .......... | B64D 11/0636 |

FOREIGN PATENT DOCUMENTS

| | | | | | |
|---|---|---|---|---|---|
| CN | 109050364 A | * | 12/2018 | ............. | B60N 2/793 |
| CN | 109591713 A | * | 4/2019 | ............. | B60N 3/001 |
| CZ | 36460 U1 | * | 10/2022 | | |
| FR | 2832676 A1 | * | 5/2003 | ............. | B60N 2/468 |
| JP | 2016132288 A | | 7/2016 | | |

(Continued)

OTHER PUBLICATIONS

Machine translation of CN-109050364-A.*

*Primary Examiner* — Dennis H Pedder
*Assistant Examiner* — Kevin P Weldon
(74) *Attorney, Agent, or Firm* — Hauptman Ham, LLP (57) ABSTRACT

A portable terminal holding device for a vehicle includes: a table configured to be stored in a storing portion provided at one end side, in a seat width direction, of a seat cushion, and that, in a state of usage, is configured to extend from the storing portion toward another end side, in the seat width direction, of the seat cushion; and a terminal holding portion that, in the state of usage of the table, is provided at a distal end side of the table and is configured to hold a portable terminal, and that, in a stored state in which the table is stored in the storing portion, projects out from the storing portion toward the other end side in the seat width direction.

10 Claims, 11 Drawing Sheets

(56) References Cited

FOREIGN PATENT DOCUMENTS

| JP | 201875875 A | 5/2018 | | |
|---|---|---|---|---|
| JP | 2018199381 A | 12/2018 | | |
| WO | WO-2015157309 A1 | * | 10/2015 | ............. B60N 3/004 |

* cited by examiner

PORTABLE TERMINAL HOLDING DEVICE FOR VEHICLE

CROSS-REFERENCE TO RELATED APPLICATION

This application is based on and claims priority under 35 USC 119 from Japanese Patent Application No. 2020-100803 filed on Jun. 10, 2020, the disclosure of which is incorporated by reference herein.

BACKGROUND

Technical Field

The present disclosure relates a portable terminal holding device for a vehicle.

Related Art

Japanese Patent Application Laid-Open (JP-A) No. 2018-075875 discloses a structure in which a holder for holding electronic equipment (a portable terminal) is fixed to the front end portion of an armrest. On the other hand, JP-A No. 2016-132288 discloses a structure in which a table is stored at the interior of an armrest.

In a case in which a portable terminal is held at the front end portion of the upper surface of an armrest as in the structure disclosed in JP-A No. 2018-075875, the user operates the portable terminal in a state in which his/her front arm is placed on the upper surface of the armrest, and it is difficult to operate the portable terminal. As a countermeasure thereto, a structure has been considered in which a holding portion for the portable terminal is provided further toward the seat width direction inner side than the armrest. However, in a case in which the storable table disclosed in JP-A No. 2016-132288 is employed in such a structure, the table that is in the state of being used and the portable terminal holding portion are disposed at the same position, and there is room for improvement.

SUMMARY

The present disclosure provides a portable terminal holding device for a vehicle in which both a storable table and a terminal holding portion may be realized.

A first aspect of the present disclosure is a portable terminal holding device for a vehicle including: a table configured to be stored in a storing portion provided at one end side, in a seat width direction, of a seat cushion, and that, in a state of usage, is configured to extend from the storing portion toward another end side, in the seat width direction, of the seat cushion; and a terminal holding portion that, in the state of usage of the table, is provided at a distal end side of the table and is configured to hold a portable terminal, and that, in a stored state in which the table is stored in the storing portion, projects out from the storing portion toward the other end side in the seat width direction.

In the portable terminal holding device for a vehicle of the first aspect, the storing portion is provided at a seat width direction one end side of the seat cushion. Further, the table, which configured to be stored in the storing portion, is provided, and, in the state of usage, this table extends from the storing portion toward the seat width direction another end side. Here, the terminal holding portion that may hold a portable terminal is provided at the distal end portion of the table that is in the state of usage. By providing the portable terminal holding portion at the table in this way, the terminal holding portion may be made to hold a portable terminal even when the table is in the state of being used.

Further, in the stored state in which the table is stored in the storing portion, the terminal holding portion projects-out from the storing portion toward the seat width direction another end side. Namely, the terminal holding portion projects-out toward the seat cushion side even when the table is in the stored state. Therefore, the terminal holding portion may be made to hold a portable terminal even when the table is not being used.

In a second aspect of the present disclosure, in the first aspect, the terminal holding portion may be mounted at the table via a connecting portion, and a slide groove portion, which, in the stored state, supports the terminal holding portion so as to be slidable in the seat width direction, is formed at the connecting portion.

In the portable terminal holding device for a vehicle relating to the second aspect of the present disclosure, the terminal holding portion is supported so as to be able to slide in the seat width direction, by the slide groove portion that is formed in the connecting portion. Therefore, in stored state of the table, by sliding the terminal holding portion, which projects-out from the storing portion, toward the seat width direction one side, the terminal holding portion may be stored in the storing portion.

In a third aspect of the present disclosure, in the second aspect, a supported portion, which, in the state of usage, may be supported at a supporting member provided at the other end side in the seat width direction of the seat cushion, is provided at the connecting portion.

In the portable terminal holding device for a vehicle relating to the third aspect, the supported portion is provided at the connecting portion. When the table is in the state of usage, the supported portion is supported by the supporting member that is provided at the other end side in the seat width direction of the seat cushion. Due thereto, the table may be supported at both sides, at the storing portion and at the supporting member.

In a fourth aspect of the present disclosure, in the third aspect, in the state of usage, the supported portion may be positioned further toward a seat lower side than the terminal holding portion.

In the portable terminal holding device for a vehicle relating to the fourth aspect of the present disclosure, when the table is in the state of usage, the supported portion is positioned further toward the seat lower side than the terminal holding portion. Therefore, when using the portable terminal portion, the supported portion need not get in the way.

In a fifth aspect of the present disclosure, in any one of the first aspect through the fourth aspect, an electricity transmission coil configured to supply electricity to the portable terminal may be provided at the terminal holding portion.

In the portable terminal holding device for a vehicle relating to the fifth aspect of the present disclosure, charging of the portable terminal may be carried out without contact, by current being made to flow to the electricity transmission coil in the state in which the portable terminal is held at the terminal holding portion.

In a sixth aspect of the present disclosure, in any one of the first aspect through the fifth aspect, the terminal holding portion may be configured to include a holding base, and a holder that is mounted at the holding base and at which the portable terminal is held, and the holder may be configured to rotate, with respect to the holding base, around a shaft having an axial direction along the seat width direction.

In the portable terminal holding device for a vehicle relating to the sixth aspect of the present disclosure, by rotating the holder in the seat front-rear direction around the shaft with respect to the holding base, the angle, in the seat front-rear direction, of the portable terminal that is held at the holder may be adjusted.

In a seventh aspect of the present disclosure, in the sixth aspect, an angle of rotation of the holder may be limited to a predetermined range.

In the portable terminal holding device for a vehicle relating to the seventh aspect of the present disclosure, by limiting the angle of rotation of the holder, the holder being rotated unnecessarily and interfering with peripheral parts may be suppressed. Further, for example, in a case in which a wire harness is connected to the holder, by limiting the angle of rotation of the holder, the wire harness becoming twisted may be suppressed.

In an eighth aspect of the present disclosure, in any one of the first aspect through the seventh aspect, the storing portion may comprise an armrest.

In the portable terminal holding device for a vehicle relating to the eighth aspect of the present disclosure, the table is stored at the interior of an armrest. Due thereto, there is no need to provide a dedicated storing portion for storing the table.

As described above, in accordance with the portable terminal holding device for a vehicle relating to the first aspect, both a storable table and a terminal holding portion may be realized.

In accordance with the portable terminal holding device for a vehicle relating to the second aspect, in a case in which the terminal holding portion is not used, the terminal holding portion getting in the way may be suppressed.

In accordance with the portable terminal holding device for a vehicle relating to the third aspect, the load resistance of the table may be improved as compared with a structure in which the table is supported in a cantilevered state.

In accordance with the portable terminal holding device for a vehicle relating to the fourth aspect, the load resistance of the table may be improved while the usability of the terminal holding portion is maintained.

In accordance with the portable terminal holding device for a vehicle relating to the fifth aspect, the portable terminal may be charged easily merely by having the terminal holding portion hold the portable terminal.

In accordance with the portable terminal holding device for a vehicle relating to the sixth aspect, the usability of the portable terminal that is held at the terminal holding portion may be improved.

In accordance with the portable terminal holding device for a vehicle relating to the seventh aspect, damage to the peripheral parts may be suppressed.

In accordance with the portable terminal holding device for a vehicle relating to the eighth aspect, space savings may be devised as compared with a structure in which a storing portion that is used exclusively for the table is provided.

BRIEF DESCRIPTION OF THE DRAWINGS

An exemplary embodiment of the present disclosure will be described in detail based on the following figures, wherein.

DETAILED DESCRIPTION

A portable terminal holding device 10 for a vehicle relating to an exemplary embodiment (hereinafter appropriately called "portable terminal holding device 10") is described with reference to the drawings. Note that arrow FR, arrow UP and arrow RH that are illustrated appropriately in the respective drawings indicate the seat forward direction, the seat upward direction, and the right side in the seat width direction of a vehicle seat 12, respectively. Hereinafter, when explanation is given by merely using front-rear, vertical, and left-right directions, they refer to the front and rear of the seat front-rear direction, the upward and downward of the seat vertical direction, and the left and right of the seat width direction, unless otherwise indicated.

Overall Structure of Vehicle Seat 12

Figure 1:
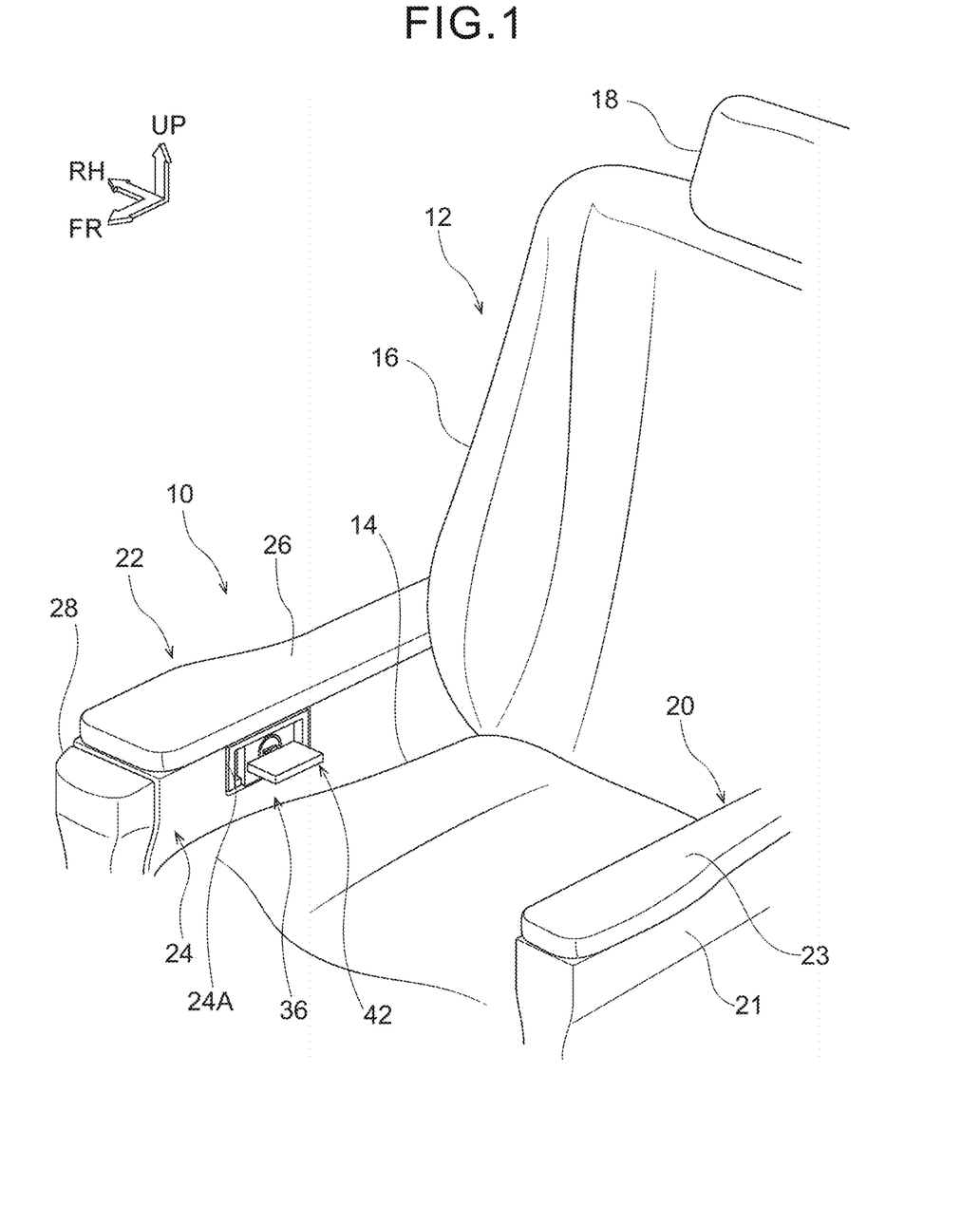
FIG. 1 is a perspective view illustrating a vehicle seat that is provided with a portable terminal holding device for a vehicle relating to an exemplary embodiment.

As illustrated in FIG. 1, the portable terminal holding device 10 of the present exemplary embodiment is provided at the seat right side of the vehicle seat 12. The vehicle seat 12 is structured to include a seat cushion 14, a seatback 16 and a headrest 18. A left side armrest 20 that serves as a supporting member is provided at the seat left side (a seat width direction another end side) of the seat cushion 14. A right side armrest 22 that serves as a storing portion is provided at the seat right side (a seat width direction one end side) of the seat cushion 14.

The left side armrest 20 is structured to include a left side standing wall portion 21 that extends vertically at the seat left side of the seat cushion 14, and a left arm supporting portion 23 that is provided at the upper end of the left side standing wall portion 21 and supports the left front arm of the vehicle occupant who is seated in the vehicle seat 12. Note that the left arm supporting portion 23 is formed of a cushion material.

Figure 9:
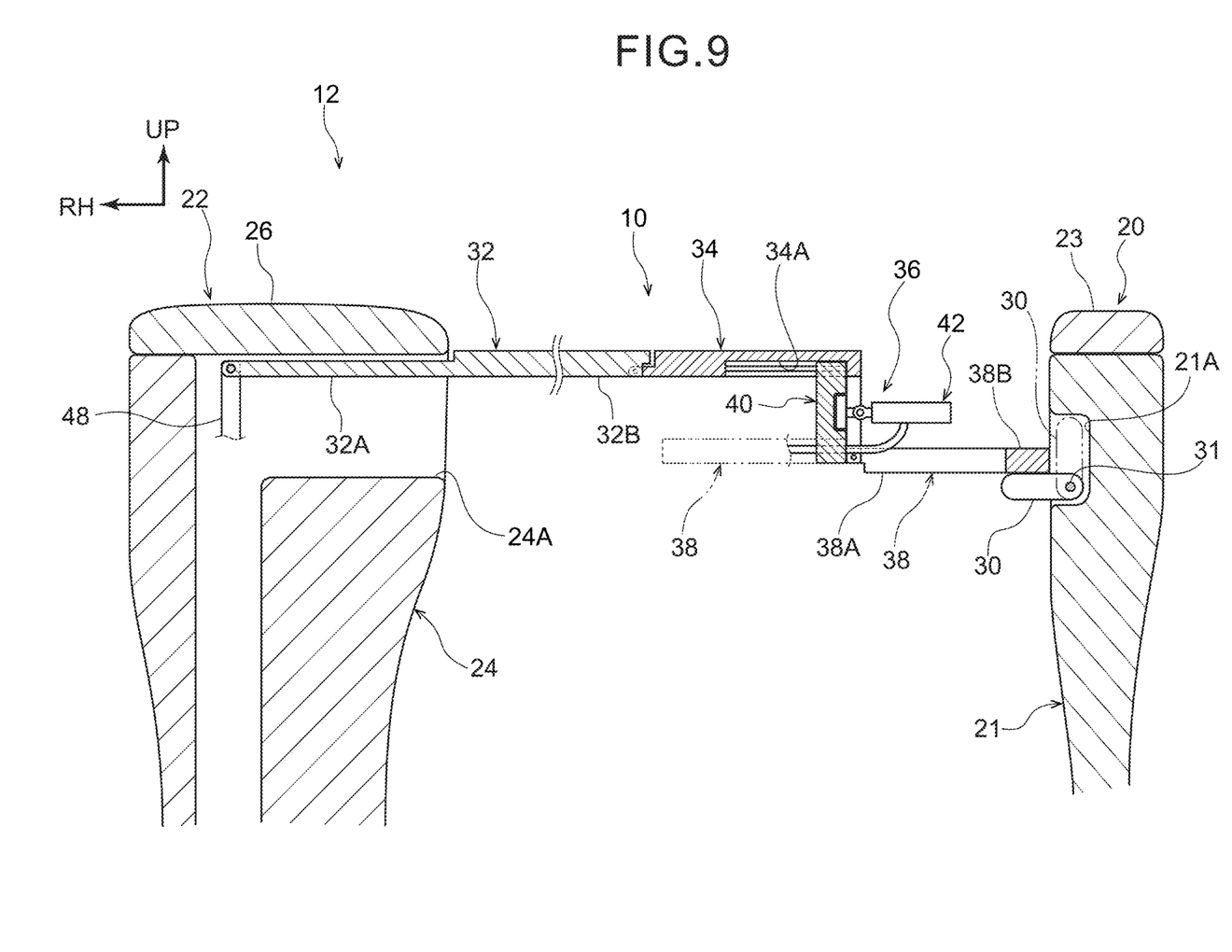
FIG. 9 is a cross-sectional view illustrating the state cut along line 9-9 of FIG. 8.

Here, as illustrated in FIG. 9, a concave portion 21A is formed in the surface, which is at the seat cushion 14 side, of the left side standing wall portion 21. A table receiving member 30 is stored in the concave portion 21A, and the table receiving member 30 is rotatably shaft-supported at a rotation shaft 31 whose axial direction is the seat front-rear direction. In FIG. 9, the state in which the table receiving member 30 is stored is illustrated by the two-dot chain lines, and the state in which the table receiving member 30 has been rotated rightward around the rotation shaft 31 and is opened is illustrated by the solid lines. Further, due to the table receiving member 30 being opened, the table receiving member 30 can support, from the lower side, a supported portion 38 that structures the portable terminal holding device 10. Details of the supported portion 38 are described later.

As illustrated in FIG. 1, the right side armrest 22 is structured to include a right side standing wall portion 24 that extends vertically at the seat right side of the seat cushion 14, and a right arm supporting portion 26 that is provided at the upper end of the right side standing wall portion 24 and supports the right front arm of the vehicle occupant who is seated in the vehicle seat 12. A front side frame portion 28 is provided at the front surface of the right side standing wall portion 24.

Figure 2:
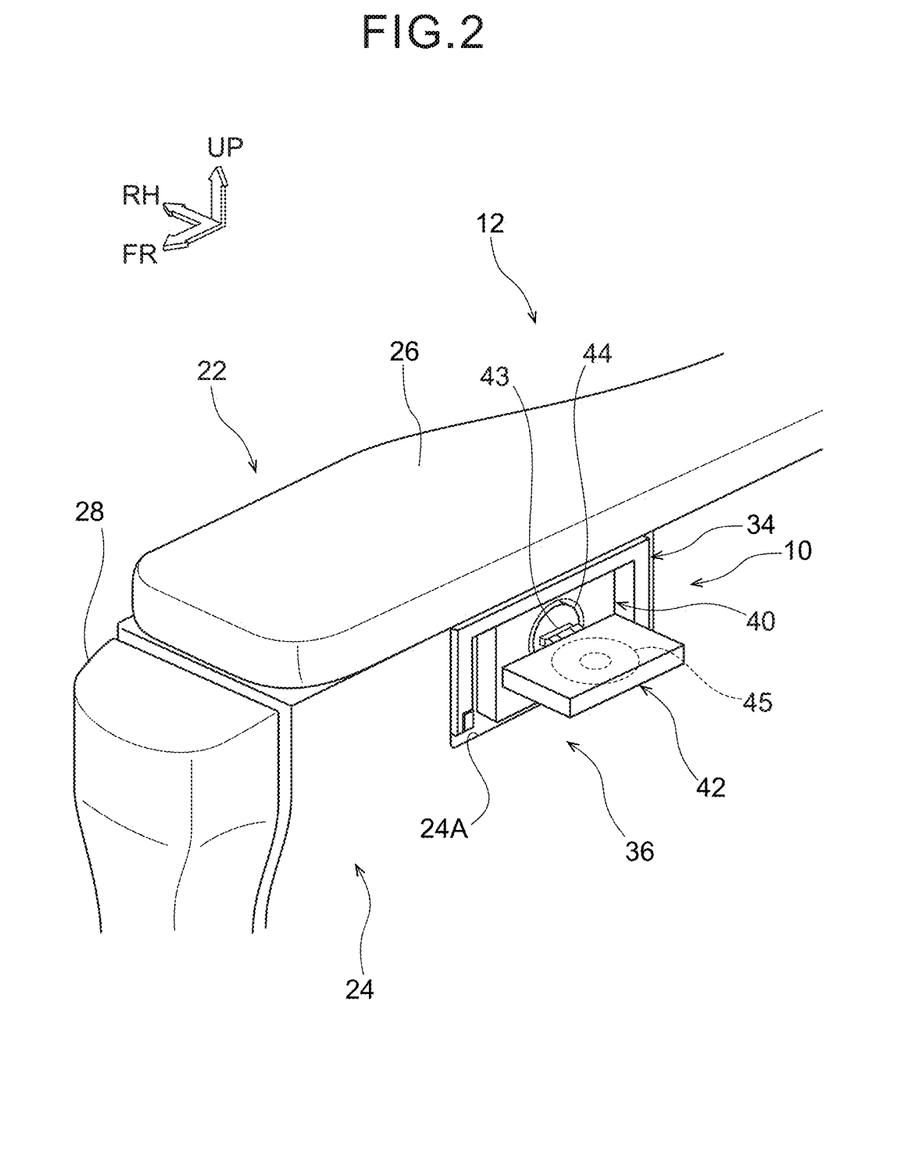
FIG. 2 is an enlarged perspective view illustrating, in an enlarged manner, the portable terminal holding device for a vehicle relating to the embodiment, and is a drawing illustrating a stored state of a table.

As illustrated in FIG. 2, a cut-out portion 24A is formed in the upper portion of the surface, which is at the seat cushion 14 side, of the right side standing wall portion 24. A storage space is provided at the interior of the right side standing wall portion 24, and the portable terminal holding device 10 of the present exemplary embodiment is stored in this storage space. In FIG. 2, a terminal holding portion 36 that structures the portable terminal holding device 10 passes-through the cut-out portion 24A and projects-out from the right side standing wall portion 24 toward the seat left side. Details of the terminal holding portion 36 are described later.

Figure 7:
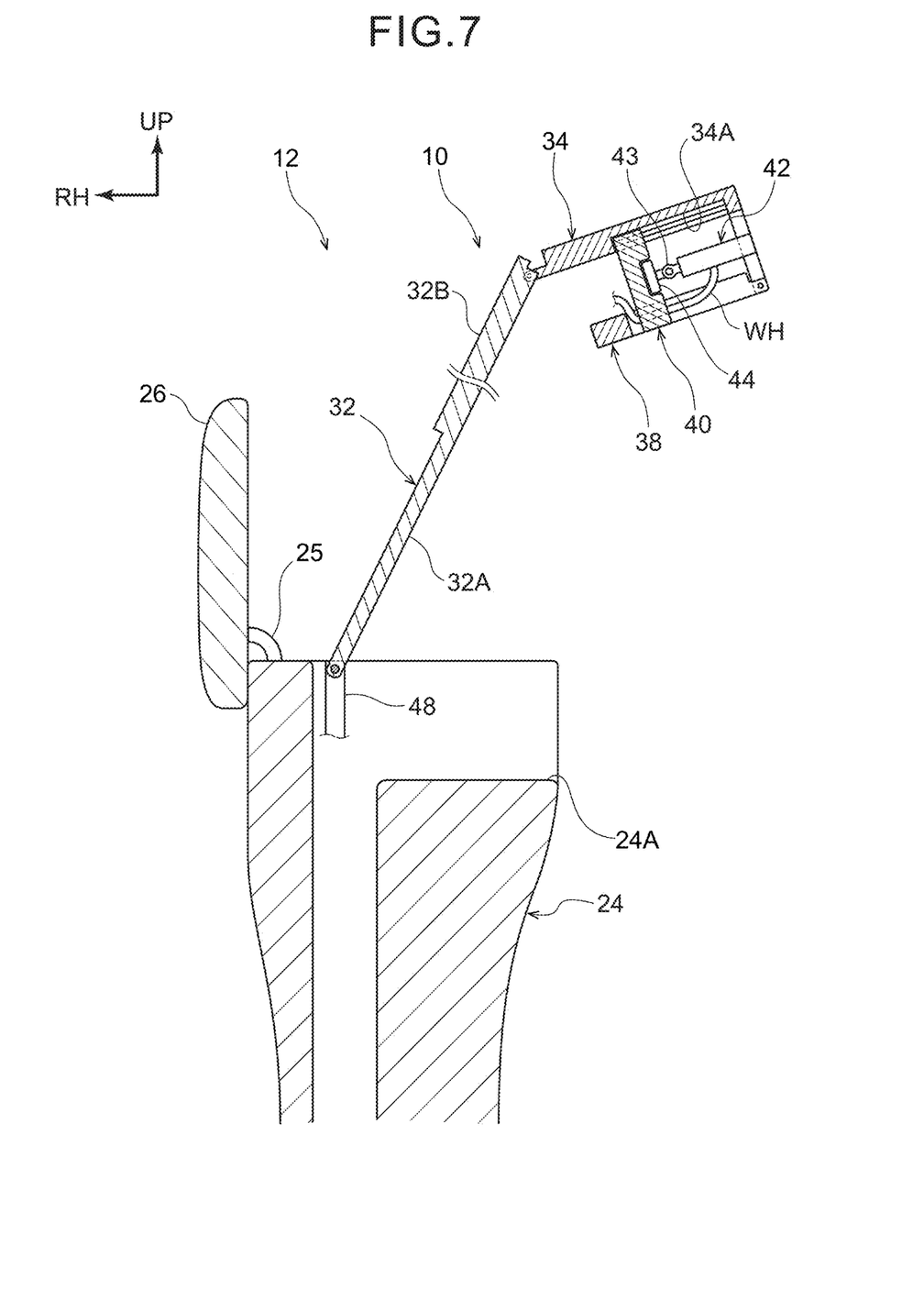
FIG. 7 is a cross-sectional view that is seen from the vehicle front side and illustrates a state in the midst of the table transitioning from the stored state to a state of usage.

In the same way as the left arm supporting portion 23, the right arm supporting portion 26 is formed of a cushion material. Here, as illustrated in FIG. 7, the right arm supporting portion 26 is connected to the right side standing wall portion 24 by a hinge portion 25 that is provided at the seat right side end portion. The right arm supporting portion 26 is structured so as to be able to open and close the opening that is at the upper end of the right side standing wall portion 24.

As illustrated in FIG. 2, the front side frame portion 28 extends vertically along the front surface of the right side standing wall portion 24. An unillustrated moving mechanism and the like, which movably support the portable terminal holding device 10, are provided at this front side frame portion 28.

Structure of Portable Terminal Holding Device 10

Figure 3:
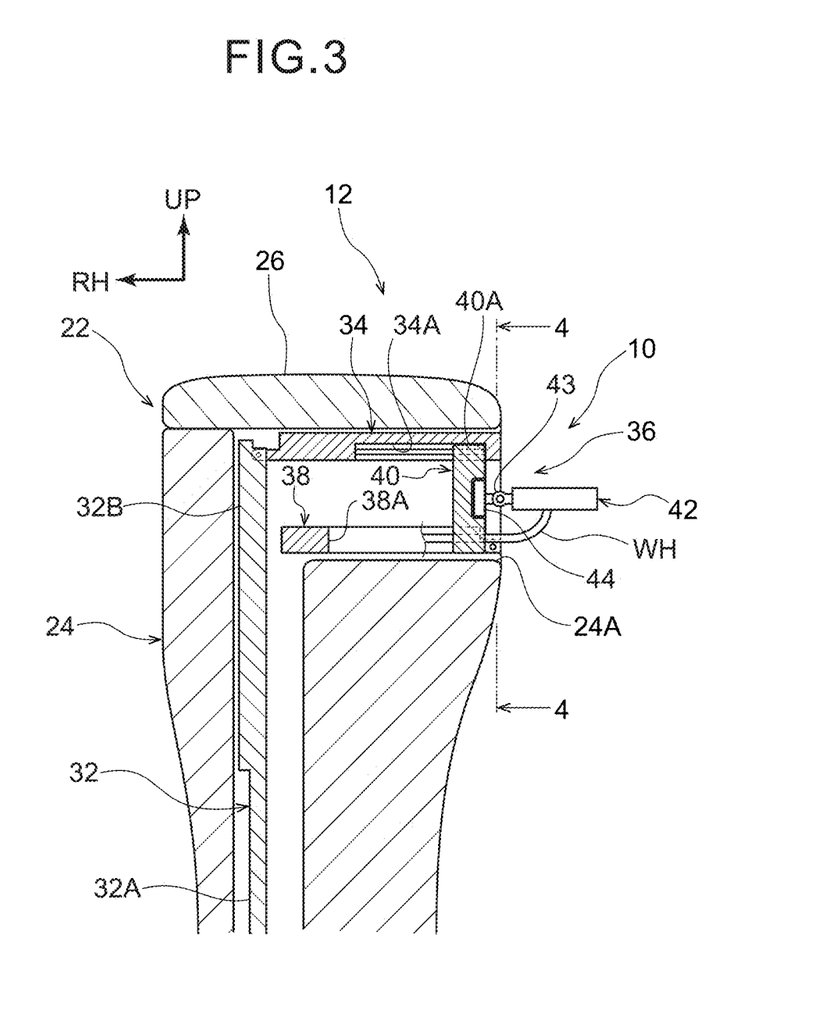
FIG. 3 is a cross-sectional view in which the portable terminal holding device for a vehicle that is illustrated in FIG. 2 is seen from a vehicle front side.

As illustrated in FIG. 3 and FIG. 9, the portable terminal holding device 10 is structured to include mainly a table 32, a connecting portion 34, the terminal holding portion 36, and the supported portion 38. Further, FIG. 3 is a cross-sectional view of a stored state in which the table 32 is stored, and FIG. 9 is a cross-sectional view of a state of usage in which the table 32 is being used.

As illustrated in FIG. 3, in the stored state, the table 32 extends in the seat vertical direction with the thickness direction thereof being the seat width direction. The lower side of the table 32 is a thin-walled portion 32A whose thickness is thinner than that of the upper side. Here, as illustrated in FIG. 9, in the state of usage, the table 32 is extended from the right side armrest 22 toward the seat left side with the thickness direction thereof being the seat vertical direction, and the thin-walled portion 32A of the table 32 is superposed with the lower surface of the right arm supporting portion 26. On the other hand, the distal end side of the table 32 (in FIG. 9, the portion further toward the seat left side than the thin-walled portion 32A) extends from the right side armrest 22 toward the seat left side, and is a placement portion 32B on which the vehicle occupant can place objects.

As illustrated in FIG. 3, the connecting portion 34 is rotatably mounted to the upper end portion of the table 32 that is in the stored state. The connecting portion 34 extends from the upper end portion of the table 32 toward the seat left side along the lower surface of the right arm supporting portion 26, and moreover, is bent downward from the left side end portion of the right arm supporting portion 26, and is formed in a substantial L-shape as seen from the seat front-rear direction. A slide groove portion 34A that extends in the seat width direction is formed in the connecting portion 34. A holding base 40 that structures the terminal holding portion 36 is slidably supported in this slide groove portion 34A.

Figure 8:
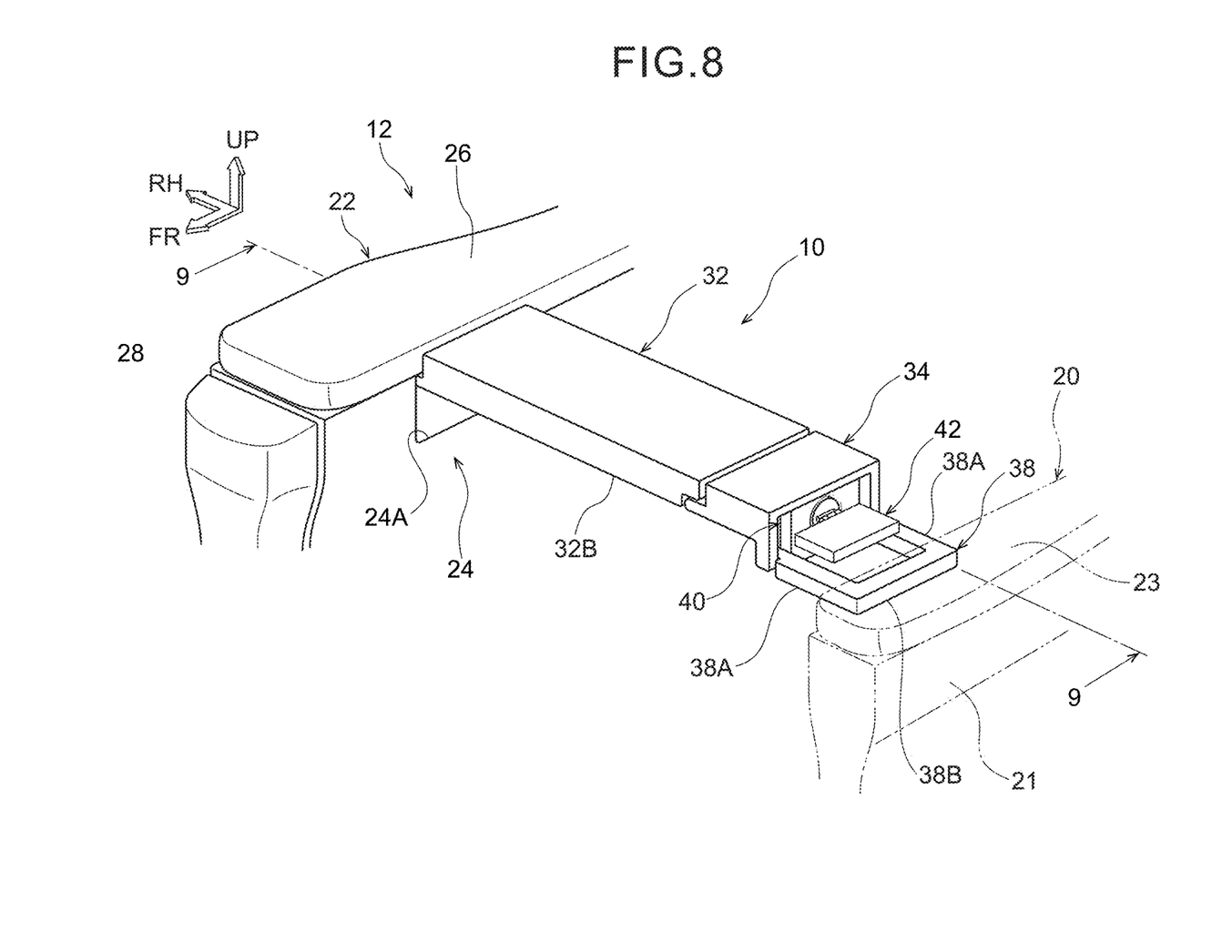
FIG. 8 is a perspective view illustrating the state of usage in which the table is being used.

The terminal holding portion 36 is mounted to the table 32 via the connecting portion 34. Concretely, as illustrated in FIG. 8 and FIG. 9, the terminal holding portion 36 is provided at the seat left side end portion (the distal end portion) of the table 32 that is in the state of being used, and is structured so as to be able to hold a portable terminal.

Figure 4:
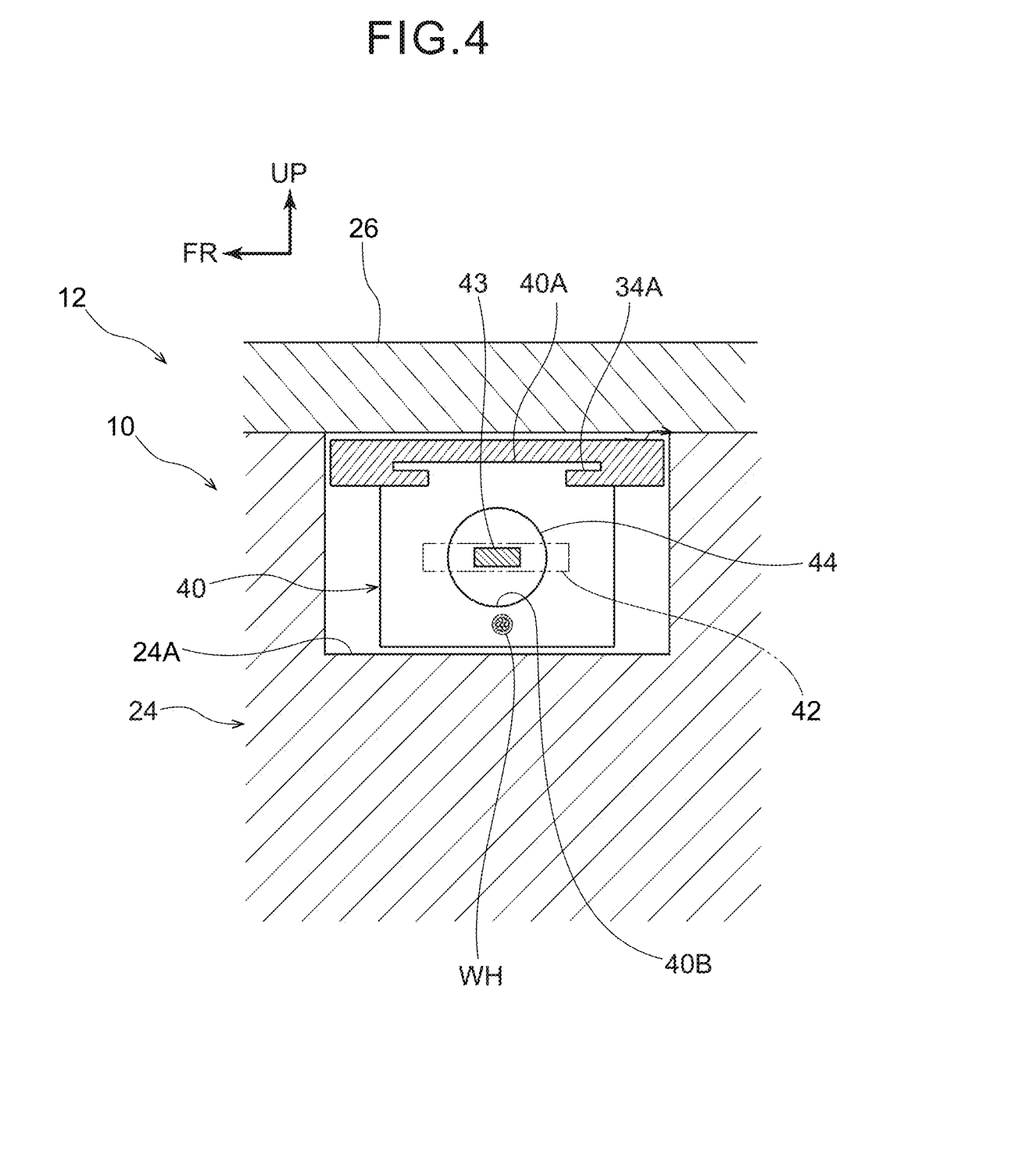
FIG. 4 is a cross-sectional view illustrating the state cut along line 4-4 of FIG. 3.

Here, the terminal holding portion 36 is structured to include the holding base 40 and a holder 42. As illustrated in FIG. 4, the holding base 40 is formed in a substantially rectangular shape as seen from the seat width direction, and a hooking portion 40A, which is slidably supported at the slide groove portion 34A of the connecting portion 34, is formed at the upper end portion of the holding base 40. Concretely, the seat front-rear direction both end portions of the hooking portion 40A are placed in the slide groove portion 34A so as to hook on the connecting portion 34, and the terminal holding portion 36 is structured so as to be able to slide in the seat width direction along the slide groove portion 34A. Further, a wire harness WH is inserted through the lower portion of the holding base 40.

Figure 5:
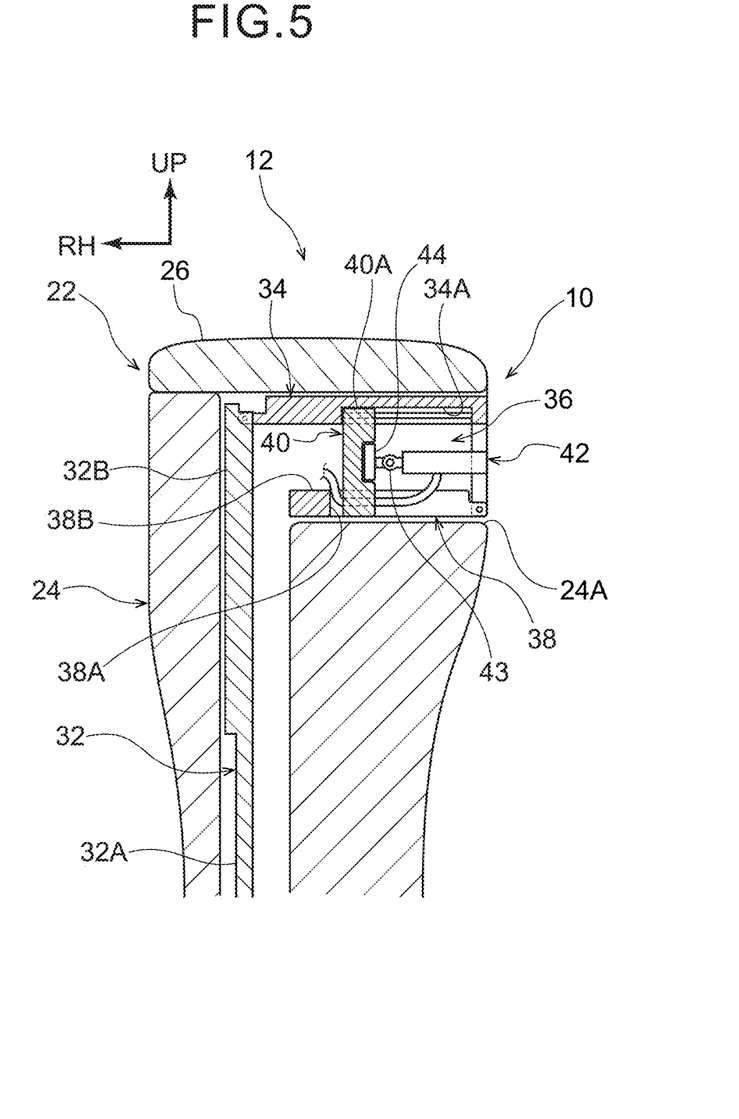
FIG. 5 is a cross-sectional view that corresponds to FIG. 3 and illustrates a state in which a terminal holding portion is stored.
Figure 6:
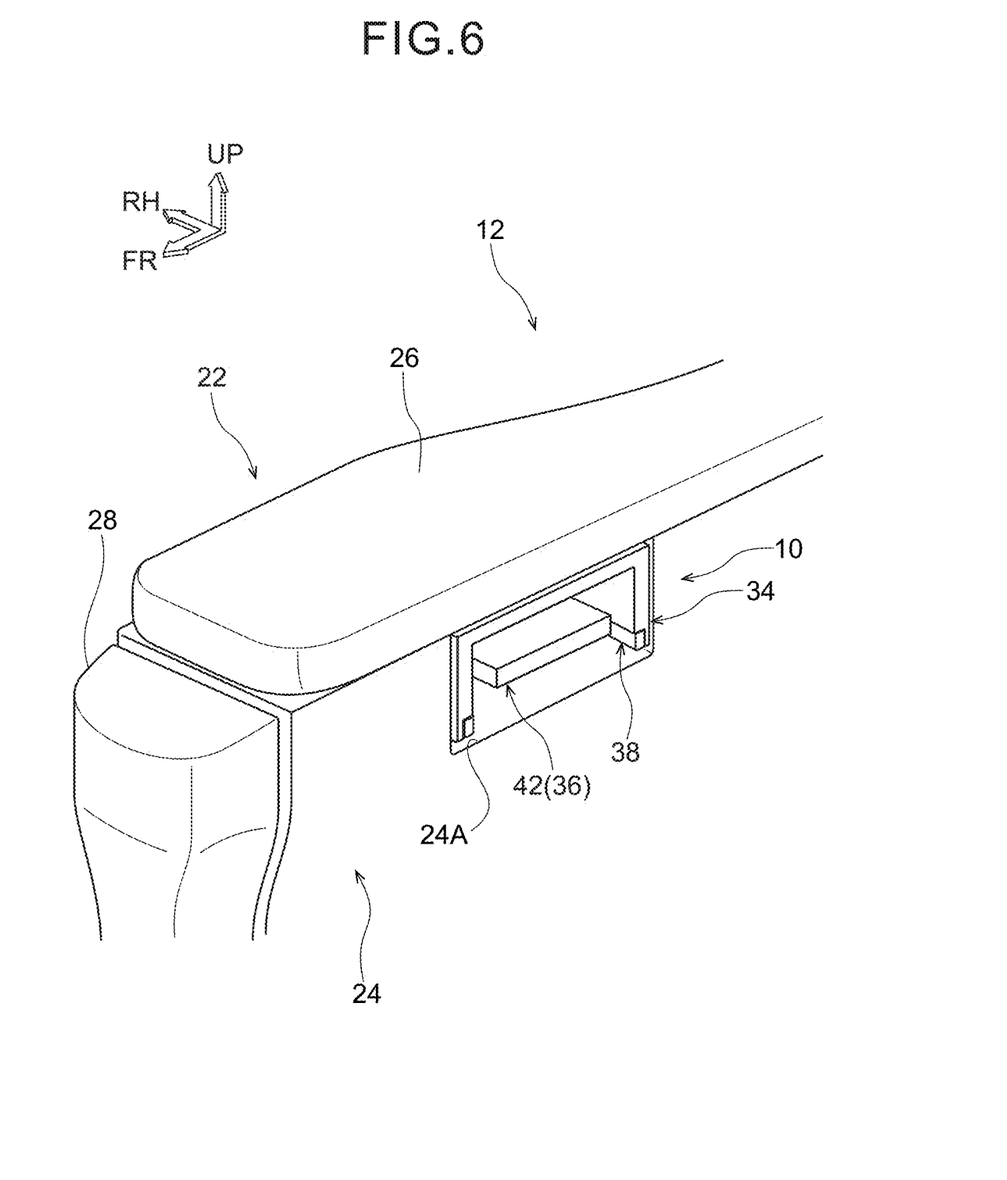
FIG. 6 is an enlarged perspective view that corresponds to FIG. 2 and illustrates the state in which the terminal holding portion is stored.

Note that, as illustrated in FIG. 3, the slide groove portion 34A is formed from the seat left end portion of the connecting portion 34 to slightly further toward the seat right side than the seat width direction central portion of the connecting portion 34. Further, in the state in which the connecting portion 34 has been slid to the right side end portion of the slide groove portion 34A, as illustrated in FIG. 5 and FIG. 6, the holder 42 of the terminal holding portion 36 is stored in the right side armrest 22.

As illustrated in FIG. 2 and FIG. 3, the holder 42 is formed substantially in the shape of a flat plate whose plate thickness direction is the seat vertical direction. In the present exemplary embodiment, as an example, at least a portion of the holder 42 is formed of a material that includes a magnet. Due thereto, by providing a case for the portable terminal that is formed of a material that includes a strong magnetic body, the portable terminal can be fixed to the holder 42 due to the case being brought near the holder 42.

The seat right side end portion of the holder 42 is connected to a second torque hinge portion 44 via a first torque hinge portion 43. The first torque hinge portion 43 is structured so as to be able to rotate around a shaft whose axial direction is the seat front-rear direction, and the angle of rotation thereof is limited to a predetermined range by an unillustrated stopper. For example, the first torque hinge portion 43 is structured so as to be able to rotate up and down within a range of −70° to +70° with respect to the horizontal direction.

As illustrated in FIG. 4, the second torque hinge portion 44 is formed in a substantially circular shape as seen from the seat width direction, and is mounted to the holding base 40 in a state of being placed within a concave portion 40B that is formed in the holding base 40. The second torque hinge portion 44 can rotate around a shaft, whose axial direction is the seat width direction, with respect to the holding base 40. Therefore, the holder 42 is structured so as to be able to rotate in the seat front-rear direction by the second torque hinge portion 44, and the angle of rotation thereof is limited to a predetermined range by an unillustrated stopper. For example, the second torque hinge portion 44 is structured so as to be able to rotate front and rear within a range of −30° to +30° with respect to the horizontal direction.

Here, as illustrated in FIG. 2, an electricity transmission coil 45 for supplying electricity to the portable terminal is provided at the interior of the holder 42. Further, as illustrated in FIG. 3, one end portion of the wire harness WH is connected to the lower surface of the holder 42, and can supply electric power to the electricity transmission coil 45. Therefore, the portable terminal can be charged by current being made to flow to the electricity transmission coil 45 in the state in which the portable terminal, which has an electricity receiving coil built into the interior thereof, is held in the holder 42. Note that, for convenience of explanation, the electricity transmission coil 45 is illustrated only in FIG. 2.

As illustrated in FIG. 3, the supported portion 38 is provided at the lower end portion of the connecting portion 34. In the stored state of the table 32, the supported portion 38 extends in the seat width direction with the plate thickness direction thereof being the seat vertical direction, and the left side end portion of the supported portion 38 is rotatably mounted to the lower end portion of the connecting portion 34 with the rotation axis direction thereof being the seat front-rear direction. Further, due to the supported portion 38 being rotated approximately 180° around the rotation axis from the state of FIG. 3, the supported portion 38 is unfolded as illustrated in FIG. 8.

Further, the supported portion 38 is formed substantially in the shape of a frame and includes a pair of front and rear arms 38A, which extend in the seat width direction from the seat front-rear direction both end portions of the connecting portion 34 respectively, and a joining portion 38B that joins the distal end portions of the pair of arms 38A together in the seat front-rear direction. The arm 38A at the front side is positioned further toward the front side than the front end portion of the holder 42, and the arm 38A at the rear side is positioned further toward the rear side than the rear end portion of the holder 42. In the unfolded state, the joining portion 38B is positioned further toward the seat left side than the holder 42. Therefore, there is a structure in which the holder 42 and the supported portion 38 do not overlap as seen in a plan view.

As illustrated in FIG. 9, in the state of usage of the table 32, due to the supported portion 38 being unfolded, the joining portion 38B of the supported portion 38 is supported on the upper surface of the table receiving member 30. Due thereto, there is a so-called state of being held at both sides in which the table 32 is supported at both ends at the right side armrest 22 and the left side armrest 20. Further, at this time, the supported portion 38 is positioned further toward the seat lower side than the holder 42 of the terminal holding portion 36.

Wire Harness WH

Figure 10:
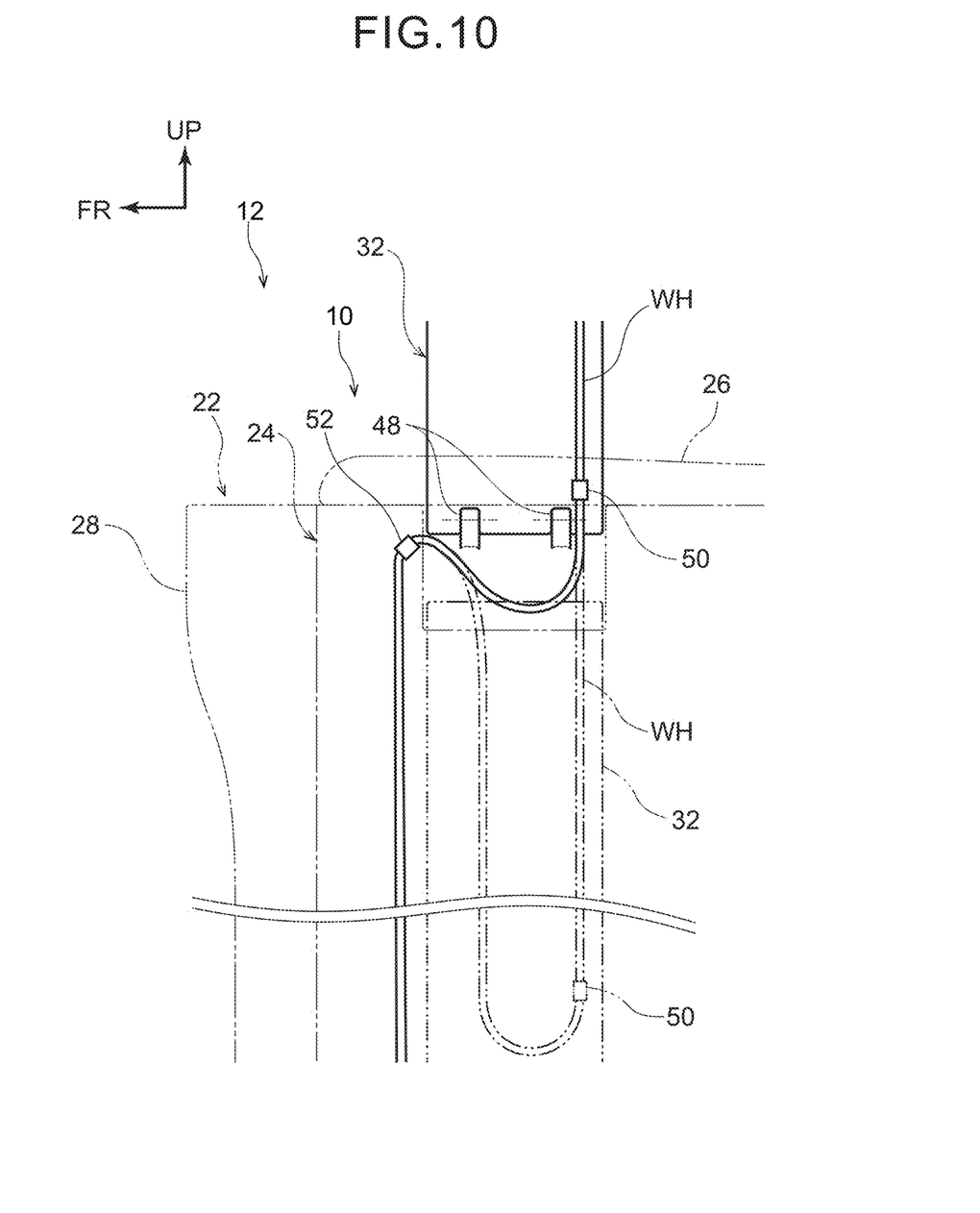
FIG. 10 is a schematic side view for explaining the movement of a wire harness.

As illustrated in FIG. 10, the wire harness WH is laid along the reverse surface (the lower surface) of the table 32.

The wire harness WH is fixed by a first fixing portion 50 that is provided at the lower end of the table 32 that is in the stored state. Further, the wire harness WH is fixed by a second fixing portion 52 that is provided at the right side standing wall portion 24 of the right side armrest 22, and extends toward the seat lower side from the second fixing portion 52. An end portion of the wire harness WH is connected to an unillustrated battery that is installed in the vehicle, and electric power can be supplied from this battery to the electricity transmission coil 45 (see FIG. 2) via the wire harness WH.

Here, the two-dot chain lines in FIG. 10 show the table 32 that is in the stored state and the wire harness WH. In this way, in the stored state of the table 32, the wire harness WH sags and an excess length portion thereof is formed between the first fixing portion 50 and the second fixing portion 52. The length of the excess length portion is set such that, when the table 32 is pulled-up toward the seat upper side at the time of being made to transition to the state of usage, the wire harness WH is stretched toward the seat upper side, and almost all of the excess length portion is eliminated.

Figure 11:
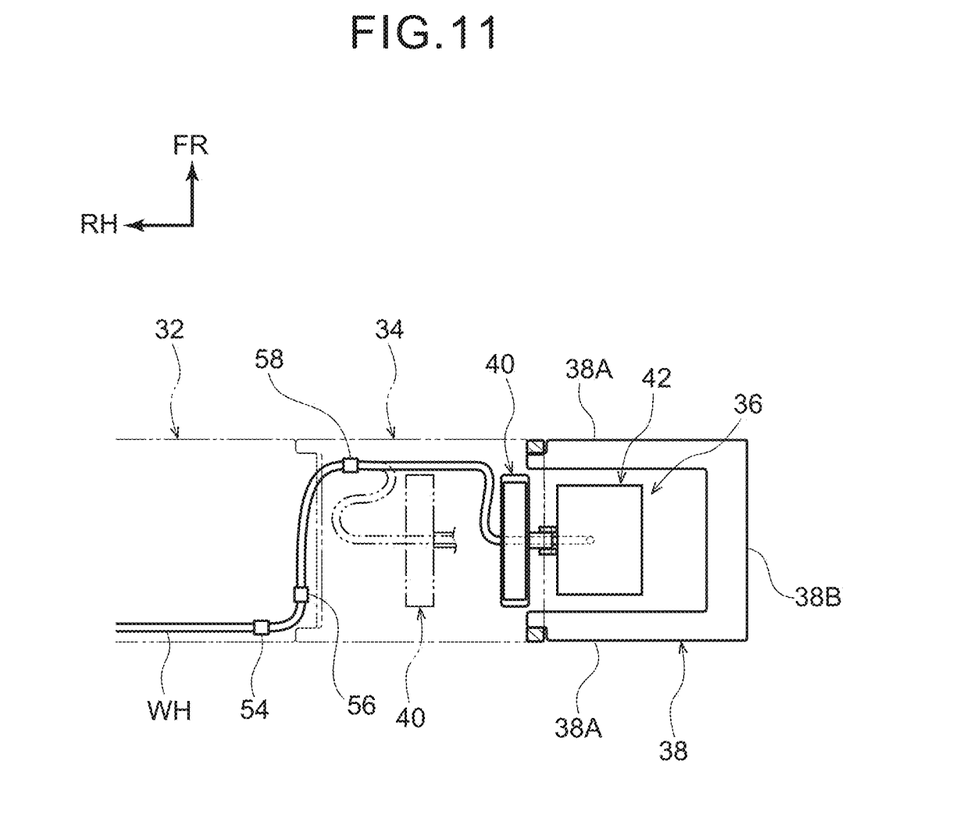
FIG. 11 is a schematic bottom view from which illustration is partially omitted and for explaining the movement of the wire harness.

As illustrated in FIG. 11, a third fixing portion 54 and a fourth fixing portion 56 are provided at the connecting portion 34 side end portion at the reverse surface of the table 32. The wire hardness WH is laid substantially linearly from the first fixing portion 50 (see FIG. 10) toward the third fixing portion 54, and moreover, is fixed to the fourth fixing portion 56 in a state of being curved substantially 90° from the third fixing portion 54.

A fifth fixing portion 58 is provided at the table 32 side end portion at the connecting portion 34. The fifth fixing portion 58 is provided at the seat front end portion that is at the opposite side, in the seat front-rear direction, from the third fixing portion 54 and the fourth fixing portion 56. Therefore, in the state of usage of the table 32, the wire harness WH extends from the fourth fixing portion 56 toward the seat front side and the seat left side, and is fixed to the fifth fixing portion 58.

Here, the two-dot chain lines in FIG. 11 show the state in which the holder 42 of the terminal holding portion 36 is stored in the right side armrest 22. In this state, the wire harness WH sags and the excess length portion is formed, between the fifth fixing portion 58 and the holding base 40. The length of the excess length portion is set such that, when the holder 42 is pulled-out toward the seat left side at the time of using the terminal holding portion 36, the wire harness WH is stretched toward the seat left side, and almost all of the excess length portion is eliminated.

Usage Method of Portable Terminal Holding Device 10

The way of using the portable terminal holding device 10 relating to the present exemplary embodiment is described next. As illustrated in FIG. 3, in the stored state in which the table 32 is stored, the holder 42 of the terminal holding portion 36 is in a state of projecting-out toward the seat left side from the right side armrest 22. In this state, the vehicle occupant who is seated in the vehicle seat 12 can cause the holder 42 to hold the portable terminal.

On the other hand, when the vehicle occupant is not using the terminal holding portion 36, due to the vehicle occupant pushing the holder 42 of the terminal holding portion 36 in toward the seat right side, as illustrated in FIG. 5, the holding base 40 is slid toward the seat right side along the slide groove portion 34A. Then, due to the holding base 40 being slid to the right side end portion of the slide groove portion 34A, the holder 42 is accommodated in the right side armrest as illustrated in FIG. 5 and FIG. 6.

Next, when the vehicle occupant is to use the table 32, as illustrated in FIG. 7, due to the right arm supporting portion 26 being opened toward the seat right side around the hinge portion 25, the opening at the upper end of the right side standing wall portion 24 is opened. Then, as illustrated in FIG. 10, the table 32 is pulled-up. Therefore, a pair of front and rear rail members 48 are joined to the lower end portion of the table 32, and the table 32 can move vertically due to these rail members 48.

As illustrated in FIG. 7, after the table 32 is pulled-up, the connecting portion 34 and the supported portion 38 are unfolded, and the table 32 is collapsed toward the seat left side, and, due thereto, there becomes the state of usage that is illustrated in FIG. 8. At this time, the rail members 48 that are illustrated in FIG. 9 are locked, and the table 32 cannot be lowered. Further, by opening the table receiving member 30 of the left side armrest 20 in advance, the supported portion 38 is supported by the table receiving member 30, and the table 32 is supported at the both ends. In this way, in the state of usage of the table 32, the holder 42 is disposed in a vicinity of the left side armrest 20.

Operation

Operation of the present exemplary embodiment is described next.

In the portable terminal holding device 10 for a vehicle of the present exemplary embodiment, as illustrated in FIG. 8 and FIG. 9, the terminal holding portion 36 that can hold a portable terminal is provided at the seat left end portion of the table 32 that is in the state of being used. Due thereto, even if the table 32 is in the state of usage, the terminal holding portion 36 can be made to hold a portable terminal.

Further, as illustrated in FIG. 2 and FIG. 3, in the stored state in which the table 32 is stored in the right side armrest 22 that is the storing portion, the holder 42 of the terminal holding portion 36 projects-out toward the seat left side from this right side armrest 22. Namely, even in the state in which the table 32 is stored within the right side armrest 22, the holder 42 projects-out toward the seat cushion 14 side. Therefore, even when the table 32 is not being used, the holder 42 can be made to hold a portable terminal, and the table 32 that is storable and the holding of a portable terminal can both be realized.

Further, by storing the table 32 in the interior of the right side armrest 22, there is no need to provide a dedicated storing portion for storing the table 32. Due thereto, space savings can be devised as compared with a structure in which a dedicated storing portion is provided.

Moreover, in the present exemplary embodiment, the holding base 40 of the terminal holding portion 36 is supported, so as to be slidable in the seat width direction, by the slide groove portion 34A that is formed in the connecting portion 34. Therefore, in the stored state of the table 32, by sliding the holder 42, which projects-out from the right side armrest 22, toward the seat width direction one side, the terminal holding portion 36 can be stored in the right side armrest 22 as illustrated in FIG. 5 and FIG. 6. Due thereto, when the terminal holding portion 36 is not used, the terminal holding portion 36 getting in the way can be suppressed.

Still further, in the present exemplary embodiment, as illustrated in FIG. 9, the supported portion 38 is provided at the connecting portion 34, and, in the state of usage of the table 32, this supported portion 38 is supported at the left side armrest 20 that is the supporting member that is provided at the seat left side of the seat cushion 14. Due thereto, the table 32 can be supported at the seat width direction both sides. Namely, the load resistance of the table 32 can be improved, while the usability of the terminal holding portion 36 is maintained.

Further, in the present exemplary embodiment, in the state of usage of the table 32, the supported portion 38 is positioned further toward the seat lower side than the terminal holding portion 36. Therefore, when used at the terminal holding portion 36, the supported portion 38 need not get in the way. Further, as illustrated in FIG. 8, because the supported portion 38 is formed so as to not overlap the holder 42 as seen in a plan view, the holder 42 does not contact the supported portion 38 even when the holder 42 is rotated.

Moreover, in the present exemplary embodiment, as illustrated in FIG. 2, the electricity transmission coil 45 for supplying electricity to the portable terminal is provided at the holder 42 of the terminal holding portion 36. Due thereto, by causing current to flow to the electricity transmission coil 45 in the state in which the portable terminal is held at the holder 42, charging of the portable terminal can be carried out without contact. As a result, the portable terminal can be easily charged merely by the portable terminal being held at the holder 42.

Still further, in the present exemplary embodiment, the angle of the portable terminal can be adjusted by rotating the holder 42 in the seat front-rear direction around the shaft with respect to the holding base 40. Due thereto, the usability of the portable terminal that is held at the holder 42 can be improved. Further, by limiting the angle of rotation of the holder 42, the holder 42 being rotated unnecessarily and interfering with peripheral parts can be suppressed. In particular, in a case in which the wire harness WH is connected to the holder 42 as in the present exemplary embodiment, by limiting the angle of rotation of the holder 42, the wire harness WH becoming twisted and load being applied thereto can be suppressed.

Although the portable terminal holding device 10 relating to the exemplary embodiment has been described above, the present disclosure can of course be implemented in various forms within a scope that does not depart from the gist thereof. For example, in the above-described exemplary embodiment, the terminal holding portion 36 is structured so as to be able to slide in the seat width direction between the state illustrated in FIG. 3 and the state illustrated in FIG. 5, but the present disclosure is not limited to this. Even in a case in which the holding base 40 of the terminal holding portion 36 is fixed to the connecting portion 34 so as to be unable to slide, the holder 42 getting in the way of the vehicle occupant can be suppressed due to the holder 42 being rotated downward by the first torque hinge portion 43.

Further, in the above-described exemplary embodiment, the terminal holding portion 36 is mounted to the table 32 via the connecting portion 34, but the present disclosure is not limited to this. For example, the terminal holding portion may be directly connected to the table 32. In this case, by forming the holding base of the terminal holding portion in an elongated form and mounting the proximal end portion of the holding base to the table 32 rotatably, the holder can be made to project-out from the right side armrest 22 even in the stored state of the table 32.

Moreover, in the above-described exemplary embodiment, the right side armrest 22 is made to be the storing portion, and the table 32 is stored in this right side armrest 22. However, the present disclosure is not limited to this. For example, there may be a structure in which the table 32 is stored in the left side armrest 20. Still further, the center console may be made to be the storing portion. Namely, in the case of a vehicle seat that does not have an armrest, effects that are similar to those of the above-described exemplary embodiment can be obtained by storing the table 32 in the center console and causing the terminal holding portion to project-out from the center console.

Still further, the above-described exemplary embodiment describes a structure in which the supported portion 38 is supported at the table receiving member 30 that is provided at the left side armrest 20, but the present disclosure is not limited to this. For example, there may be a structure in which the supported portion 38 is supported at the upper surface of the left side armrest 20. In this case, the table receiving member 30 of the left side armrest 20 is unnecessary. Further, if it is made such that the table 32 becomes horizontal in the state in which the supported portion 38 is supported at the upper surface of the left side armrest 20, deterioration of the usability of the table 32 can be suppressed.

Further, in the above-described exemplary embodiment, as illustrated in FIG. 9, in the state of usage of the table 32, the supported portion 38 is positioned further toward the seat lower side than the holder 42. However, the present disclosure is not limited to this. For example, in the state of usage of the table 32, the supported portion 38 may be disposed further toward the seat upper side than the holder 42. In this case as well, by using a supported portion in which the arm 38A that is at the seat rear side of the supported portion 38 is removed and that is formed in a substantial L-shape as seen in plan view, there becomes a structure in which it is difficult for the supported portion to get in the way at the time when the vehicle occupant operates the portable terminal.

What is claimed is:

1. A portable terminal holding device for a vehicle, the device comprising:
   a table configured to be stored in a storing portion provided at one end side, in a seat width direction, of a seat cushion, and that, in a state of usage, is configured to extend from the storing portion toward another end side, in the seat width direction, of the seat cushion; and
   a terminal holding portion that, in the state of usage of the table, is provided at a distal end side of the table and is configured to hold a portable terminal, and that, in a stored state in which the table is stored in the storing portion, projects out from the storing portion toward the other end side in the seat width direction,
   wherein
   the terminal holding portion is mounted at the table via a connecting portion, and
   a slide groove portion, which, in the stored state, supports the terminal holding portion so as to be slidable in the seat width direction, is formed at the connecting portion.

2. The portable terminal holding device of claim 1, wherein a supported portion, which, in the state of usage, is supported at a supporting member provided at the other end side in the seat width direction of the seat cushion, is provided at the connecting portion.

3. The portable terminal holding device of claim 2, wherein, in the state of usage, the supported portion is positioned further toward a seat lower side than the terminal holding portion.

4. The portable terminal holding device of claim 1, wherein an electricity transmission coil configured to supply electricity to the portable terminal is provided at the terminal holding portion.

5. The portable terminal holding device of claim 1, wherein:
   the terminal holding portion is configured to include a holding base, and a holder that is mounted at the holding base and at which the portable terminal is held, and
   the holder is configured to rotate, with respect to the holding base, around a shaft having an axial direction along the seat width direction.

6. The portable terminal holding device of claim 5, wherein an angle of rotation of the holder is limited to a predetermined range.

7. The portable terminal holding device of claim 1, wherein the storing portion comprises an armrest.

8. The portable terminal holding device of claim 2, wherein:
   the supporting member comprises an armrest that is provided at the other end side in the seat width direction of the seat cushion,
   a table receiving member is stored in a concave portion that is formed in a surface of the armrest facing a side of the seat cushion, and
   the supported portion is supported at the table receiving member.

9. A portable terminal holding device for a vehicle, the device comprising:
   a table configured to be stored in a storing portion provided at one end side, in a seat width direction, of a seat cushion, and that, in a state of usage, is configured to extend from the storing portion toward another end side, in the seat width direction, of the seat cushion; and
   a terminal holding portion that, in the state of usage of the table, is provided at a distal end side of the table and is configured to hold a portable terminal, and that, in a stored state in which the table is stored in the storing portion, projects out from the storing portion toward the other end side in the seat width direction,
   wherein
   the terminal holding portion is configured to include a holding base, and a holder that is mounted at the holding base and at which the portable terminal is held, and
   the holder is configured to rotate, with respect to the holding base, around a shaft having an axial direction along the seat width direction.

10. The portable terminal holding device of claim 9, wherein an angle of rotation of the holder is limited to a predetermined range.

* * * * *